(12) United States Patent
Pathiratne

(10) Patent No.: US 11,384,782 B2
(45) Date of Patent: Jul. 12, 2022

(54) FURNITURE FRAME

(71) Applicant: Coddle, Inc., Newark, CA (US)

(72) Inventor: Sean Pathiratne, Newark, CA (US)

(73) Assignee: Coddle, Inc., Newark, CA (US)

(*) Notice: Subject to any disclaimer, the term of this patent is extended or adjusted under 35 U.S.C. 154(b) by 0 days.

(21) Appl. No.: 16/266,776

(22) Filed: Feb. 4, 2019

(65) Prior Publication Data

US 2019/0309778 A1 Oct. 10, 2019

Related U.S. Application Data

(60) Provisional application No. 62/627,057, filed on Feb. 6, 2018.

(51) Int. Cl.
| | | |
|---|---|---|
| *F16M 11/00* | (2006.01) | |
| *F16B 12/32* | (2006.01) | |
| *F16B 12/52* | (2006.01) | |
| *B21C 23/08* | (2006.01) | |
| *F16B 12/50* | (2006.01) | |
| *F16B 12/40* | (2006.01) | |

(52) U.S. Cl.
CPC ............ *F16B 12/32* (2013.01); *B21C 23/085* (2013.01); *F16B 12/40* (2013.01); *F16B 12/50* (2013.01); *F16B 12/52* (2013.01)

(58) Field of Classification Search
CPC ....... F16M 11/00; A47B 23/043; A47B 97/08; A47B 19/08; A47B 3/08
USPC ............ 248/441.1, 444, 460, 461, 463, 464
See application file for complete search history.

(56) References Cited

U.S. PATENT DOCUMENTS

| | | | |
|---|---|---|---|
| 2,696,415 A | 12/1954 | Himelson | |
| 3,088,785 A | 5/1963 | Schuette | |
| 5,535,683 A * | 7/1996 | Novak | A45C 9/00 |
| | | | 108/11 |
| 5,647,286 A | 7/1997 | Dunn | |
| 5,660,117 A * | 8/1997 | Noble | A47B 23/043 |
| | | | 108/35 |
| 6,547,264 B1 | 4/2003 | Blackburn | |
| 7,111,341 B2 | 9/2006 | Hennings et al. | |
| 8,915,478 B2 * | 12/2014 | Perez | F16M 11/32 |
| | | | 248/439 |
| 2002/0040667 A1 * | 4/2002 | Birsel | A47B 21/00 |
| | | | 108/25 |
| 2005/0273929 A1 * | 12/2005 | Hennings | A47C 19/22 |
| | | | 5/201 |
| 2016/0345739 A1 * | 12/2016 | McCullough | A47C 4/02 |
| 2018/0055237 A1 * | 3/2018 | Odutayo | A47C 19/04 |
| 2018/0238041 A1 * | 8/2018 | Styrc | E04B 1/1912 |
| 2020/0187654 A1 * | 6/2020 | Mutyala | A47C 17/34 |

* cited by examiner

*Primary Examiner* — Steven M Marsh
(74) *Attorney, Agent, or Firm* — Dykema Gossett PLLC (57) ABSTRACT

A furniture frame is provided that includes a plurality of frame members and a socket coupled to at least one of the plurality of frame members. The socket may include a plurality of walls arranged about a central axis and enclosing the central axis. The frame may further include a leg configured to be removably inserted into the socket. A first portion of the leg that is configured to be inserted into the socket may include walls having approximately a first thickness, and a second portion of the leg that is not configured to be inserted into the socket may include walls having approximately a second thickness that is twice as large as the first thickness. The frame members, socket, and leg may comprise metal.

16 Claims, 12 Drawing Sheets

FURNITURE FRAME

CROSS-REFERENCE TO RELATED APPLICATION

This application claims priority to U.S. Provisional Patent Application No. 62/627,057 filed Feb. 6, 2018, the disclosure of which is incorporated hereby by reference.

TECHNICAL FIELD

The present disclosure relates in general to furniture, and more particularly to frames and/or legs for supporting such furniture.

BACKGROUND

Various types of furniture may be supported by a frame. Such a frame may include removable members, such as removable legs. Further, in some embodiments, the frame itself may include a plurality of removable members as sections which must be assembled together into one frame.

As one example, frames according to the present disclosure may be useful in sofas. A sofa is typically an upholstered item of furniture for the comfortable seating of more than one person, typically having an armrest on both sides of the sofa along with a back rest. Sofas are usually to be found in the family room, living room, den or the lounge. They may be covered in a variety of textiles or in leather.

As another example, frames according to the present disclosure may be useful in sofa-beds, which are similar to the aforementioned sofas, except that they typically include a mechanism that enables the sofa bed to be changed by the end user from a sofa position, to a lounge position, or to a bed position.

In other embodiments, this disclosure may be applicable to other types of furniture as well. For example, chairs, beds, tables, or any other suitable type of furniture may benefit from the application of the teachings of this disclosure.

In some furniture, removable members may need to be assembled by an end user of the furniture after its delivery. In existing solutions, removable members are typically secured by the end user with various items of hardware such as machine screws, bolts, nuts, and/or washers. The necessity of using such hardware may be time-consuming and cause various difficulties for an end user. For example, it may take an inexperienced end user a significant amount of time to complete such an assembly, and such hardware is easily lost or incomplete when shipped. Further, tools are sometimes included for assembling such furniture, increasing expense and the possibility of losing small parts.

According to some embodiments of this disclosure, various drawbacks of existing solutions may be mitigated. For example, some embodiments may aid in allowing an end user to quickly assemble a furniture frame while maintaining low shipping cost and providing a sturdy frame with a several hundred pound weight capacity, but not significantly increasing the overall weight of the frame.

SUMMARY

In accordance with the teachings of the present disclosure, the disadvantages and problems associated with existing furniture frames may be substantially reduced or eliminated.

In accordance with embodiments of the present disclosure, a furniture frame may include a plurality of frame members and a socket coupled to at least one of the plurality of frame members. The socket may include a plurality of walls arranged about a central axis and enclosing the central axis. A leg may further be configured to be removably inserted into the socket. A first portion of the leg that is configured to be inserted into the socket may include walls having approximately a first thickness, and a second portion of the leg that is not configured to be inserted into the socket may include walls having approximately a second thickness that is twice as large as the first thickness. The frame members, socket, and leg may comprise metal.

In accordance with these and other embodiments of the present disclosure, a method may include forming a plurality of frame members from a frame material; forming a socket coupled to at least one of the plurality of frame members, the socket comprising a plurality of walls arranged about a central axis and enclosing the central axis; forming a leg configured to be removably inserted into the socket; and shaping and sizing the leg such that a first portion of the leg that is configured to be inserted into the socket includes walls having approximately a first thickness, and a second portion of the leg that is not configured to be inserted into the socket includes walls having approximately a second thickness that is twice as large as the first thickness.

In accordance with these and other embodiments of the present disclosure, a furniture leg may include a first portion that is configured to be received by a socket of a furniture frame, and a second portion that is not configured to be received by the socket. The first portion may include walls having approximately a first thickness, and the second portion may include walls having approximately a second thickness that is twice as large as the first thickness.

Technical advantages of the present disclosure may be readily apparent to one skilled in the art from the figures, description and claims included herein. The objects and advantages of the embodiments may be realized and achieved at least by the elements, features, and combinations particularly pointed out in the claims. Various embodiments may achieve all, some, or even none of the mentioned advantages. Further, one of ordinary skill with the benefit of this disclosure will understand that elements from one claim may be readily combined with elements from another claim, even if such a combination is not explicitly recited in any particular claim.

It is to be understood that both the foregoing general description and the following detailed description are examples and explanatory in nature, and they are not restrictive of the claims set forth in this disclosure. Further, the characterization of an element as "background" or the like should not be construed as an admission that it constitutes prior art.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 1 illustrates an isometric view with detail views of a furniture frame with attached legs, in accordance with some embodiments of the present disclosure;

FIG. 2 illustrates an isometric view with detail views of a furniture frame with attached legs, in accordance with some embodiments of the present disclosure;

FIG. 3 illustrates an isometric view with detail views of a furniture frame, in accordance with some embodiments of the present disclosure;

FIG. 4 illustrates an isometric view with detail views of a furniture frame with attached legs, in accordance with some embodiments of the present disclosure;

FIG. 5 illustrates detail views of a furniture leg, in accordance with some embodiments of the present disclosure;

FIG. 6 illustrates detail views of a furniture leg, in accordance with some embodiments of the present disclosure; and FIG. 7 illustrates detail views of a push-lock button, in accordance with some embodiments of the present disclosure.

DETAILED DESCRIPTION

Preferred embodiments and their advantages are best understood by reference to FIGS. 1 through 7, wherein like numbers are used to indicate like and corresponding parts.

For purposes of this disclosure, the term "approximately" as applied to a numerical feature should be understood to refer to any value within 10% of that numerical feature. For example, the term "approximately 50" would be understood to encompass a numerical range from 50 minus 10% to 50 plus 10% (that is, 45 to 55) inclusive.

For the purposes of this disclosure, the term "substantially planar" should be understood to refer to an arrangement of parts that (discounting the thickness of the parts themselves, and ignoring minor deviations from the ideal) lie along a particular geometrical plane. For example, a picture frame might be referred to as "substantially planar," but a box would not.

Turning now to FIG. 1, a schematic diagram of a furniture frame with various detail insets is shown. The frame of FIG. 1 might be used to support a sofa bed or some other item of furniture. In FIG. 1 and elsewhere, various physical dimensions are shown. One of ordinary skill in the art with the benefit of this disclosure will recognize such dimensions as being exemplary in nature and providing details about one particular embodiment. Unless otherwise specified or otherwise clear from context, dimensions in this disclosure should be understood to refer to millimeters.

As can be seen in FIG. 1, several steel frame members (e.g., stainless steel) have been fully welded together to form a furniture frame, which is configured to accept four steel legs at its outside corners. The welded frame in this embodiment is substantially planar. The legs in this embodiment are at an angle of 102° from the plane of the frame members. In other embodiments, the legs may be disposed at a right angle or any other suitable angle. Further, portions of the legs (as described in further detail below) may have a thickness of 1.5 mm or any other suitable thickness.

As further shown in FIG. 1, the thickness of the frame members in this embodiment is 1.0 mm. In other embodiments, the thickness may be 1.5 mm or any other suitable thickness. In general, the thickness of the frame members may be the same as or different from the thickness of the leg material.

Figure 1A:
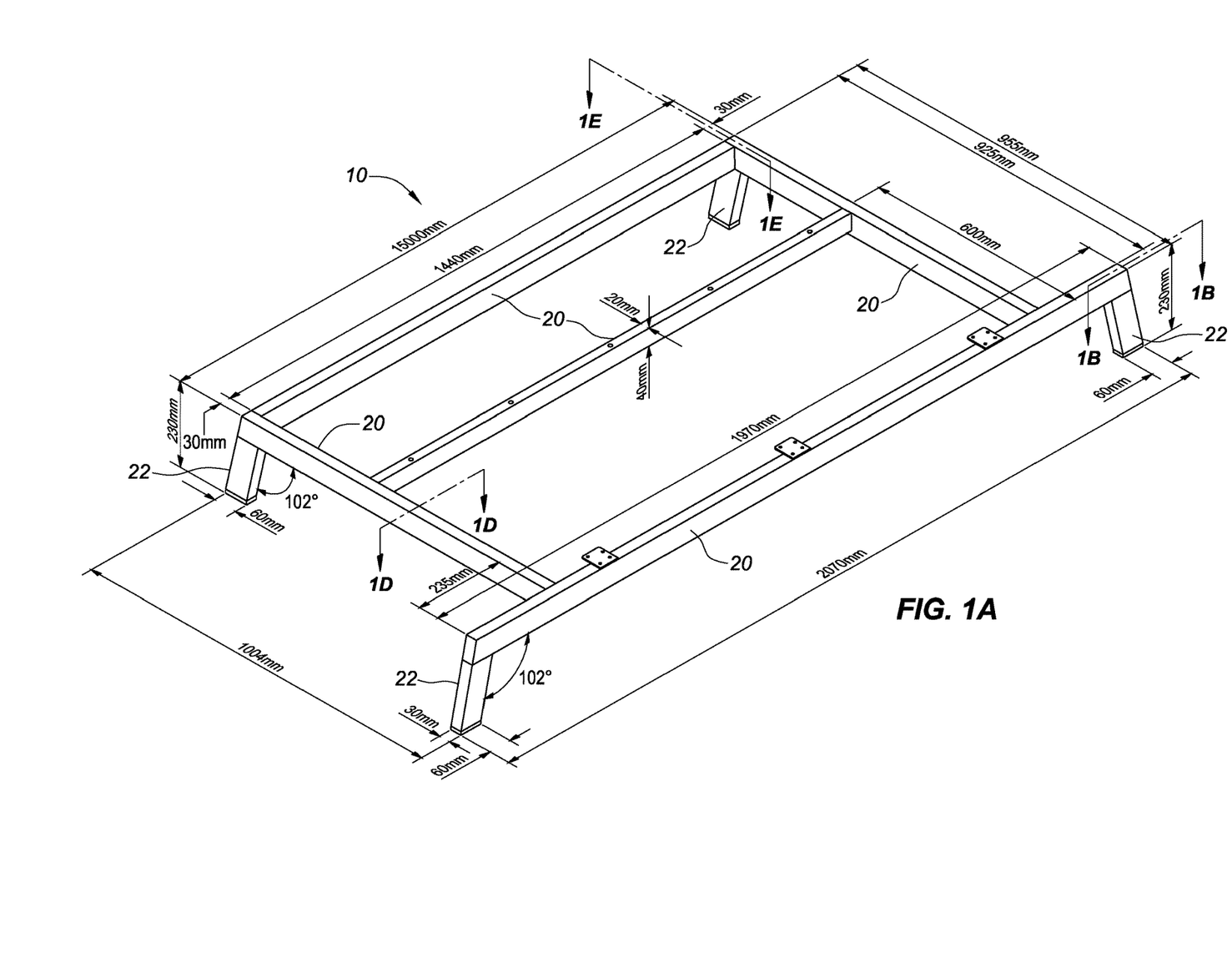
Figure 1B:
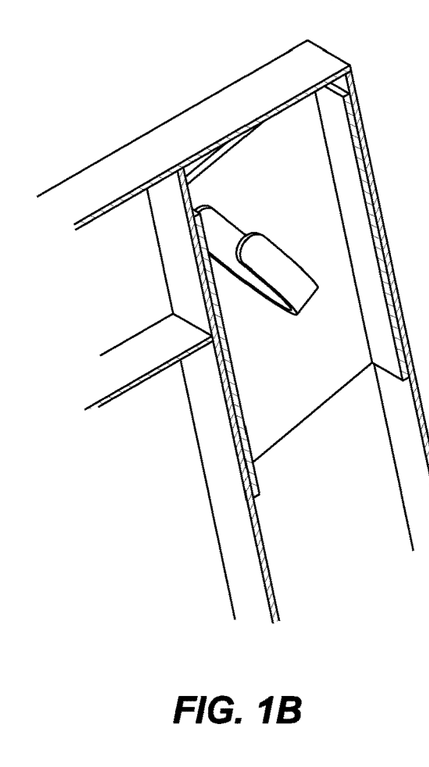
Figure 1C:
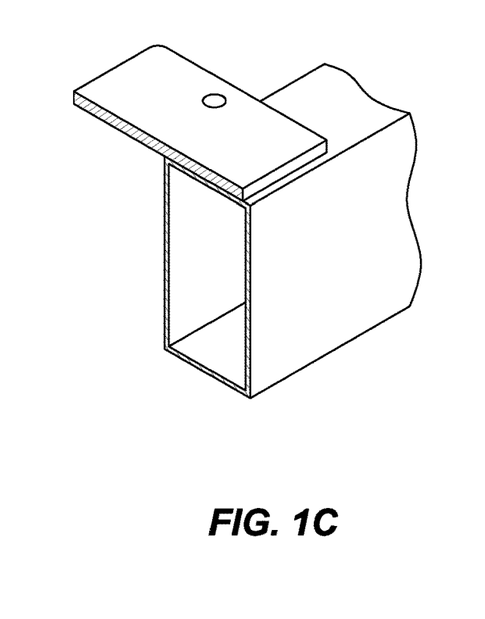
Figure 1D:
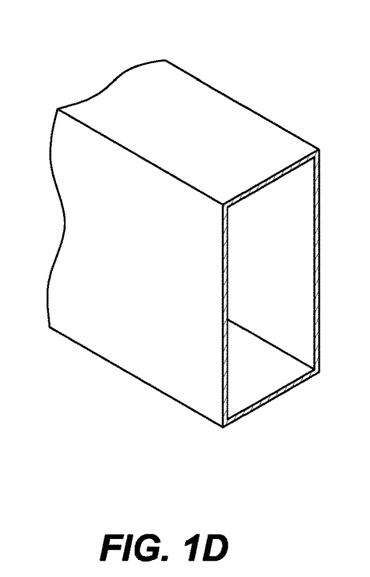
Figure 1E:
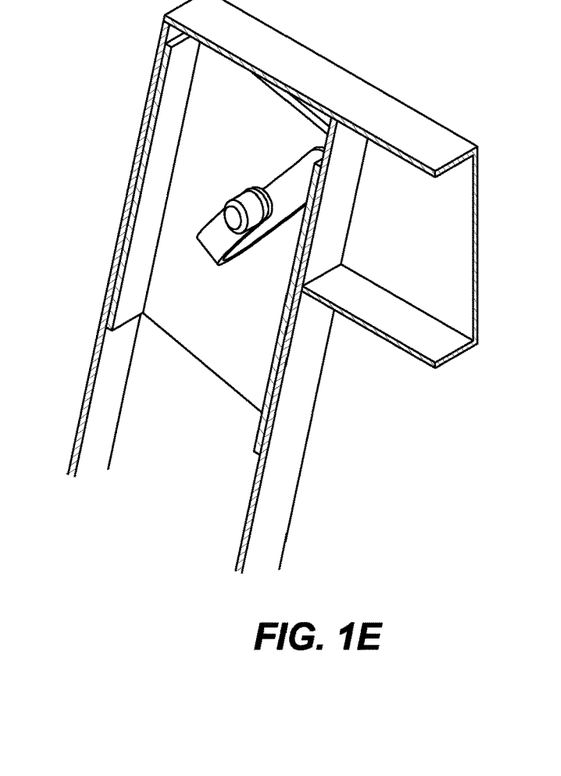
Figure 2A:
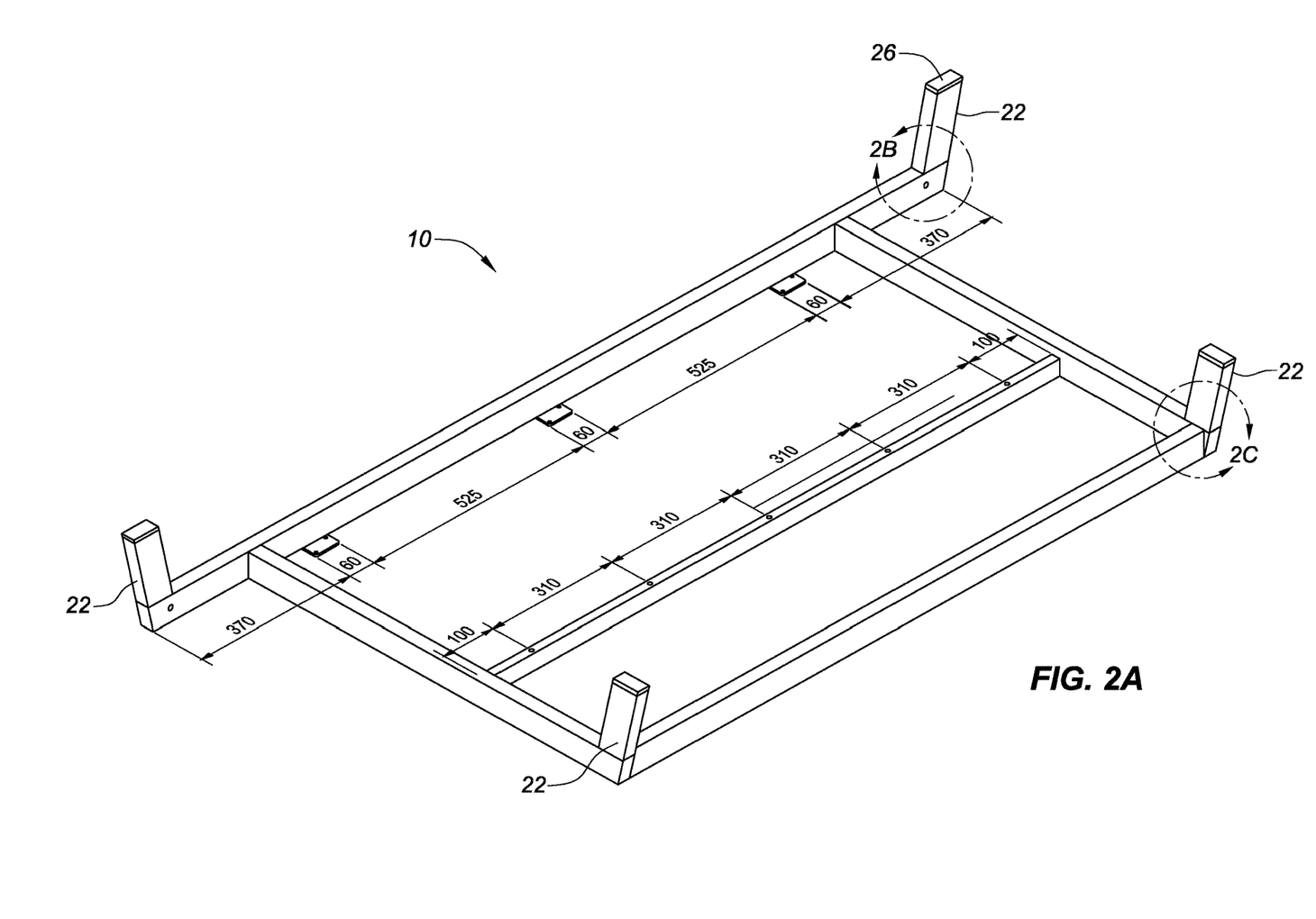
Figure 2B:
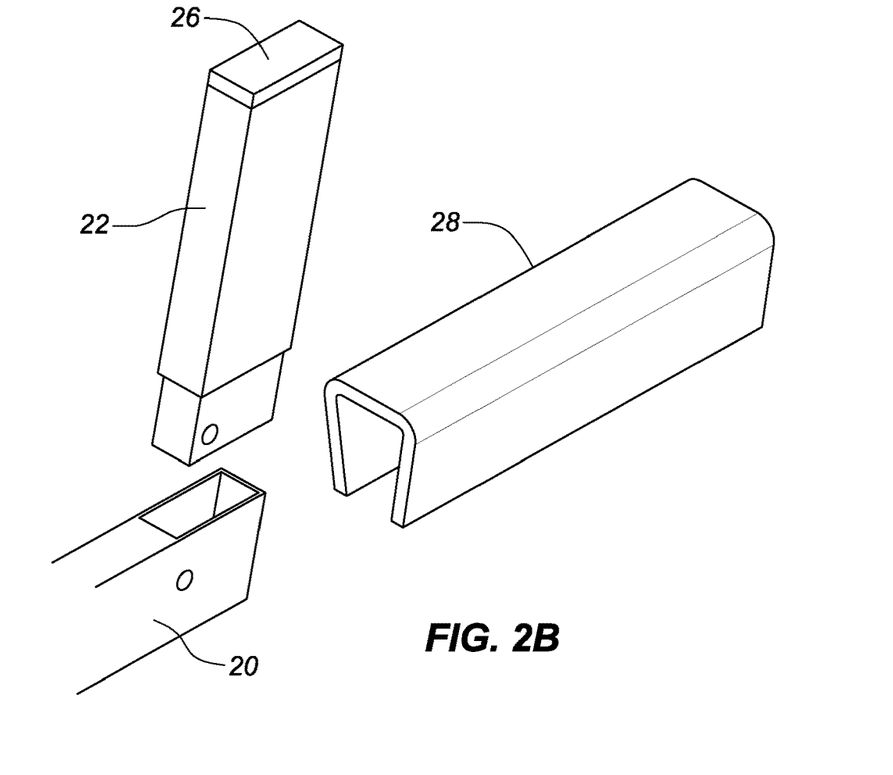
Figure 2C:
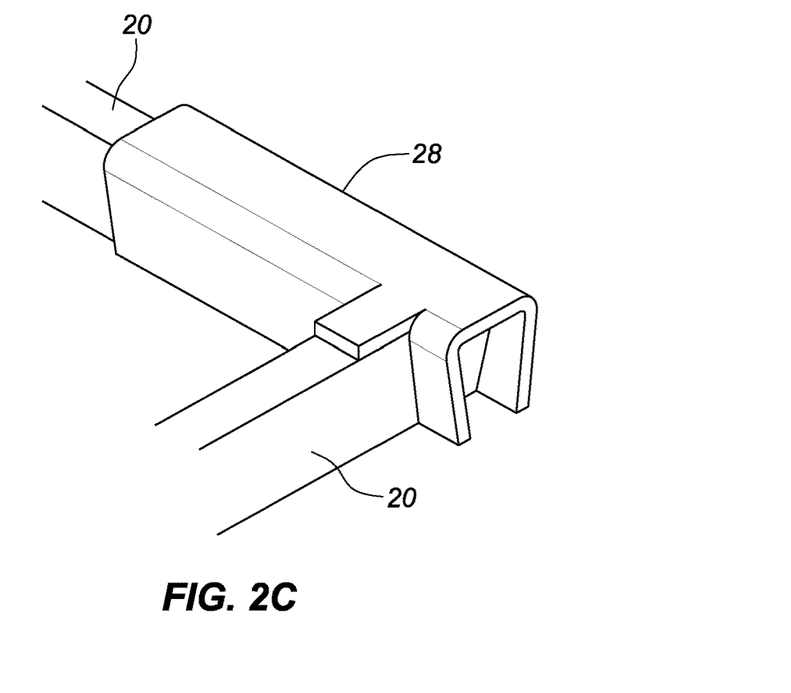
Figure 3A:
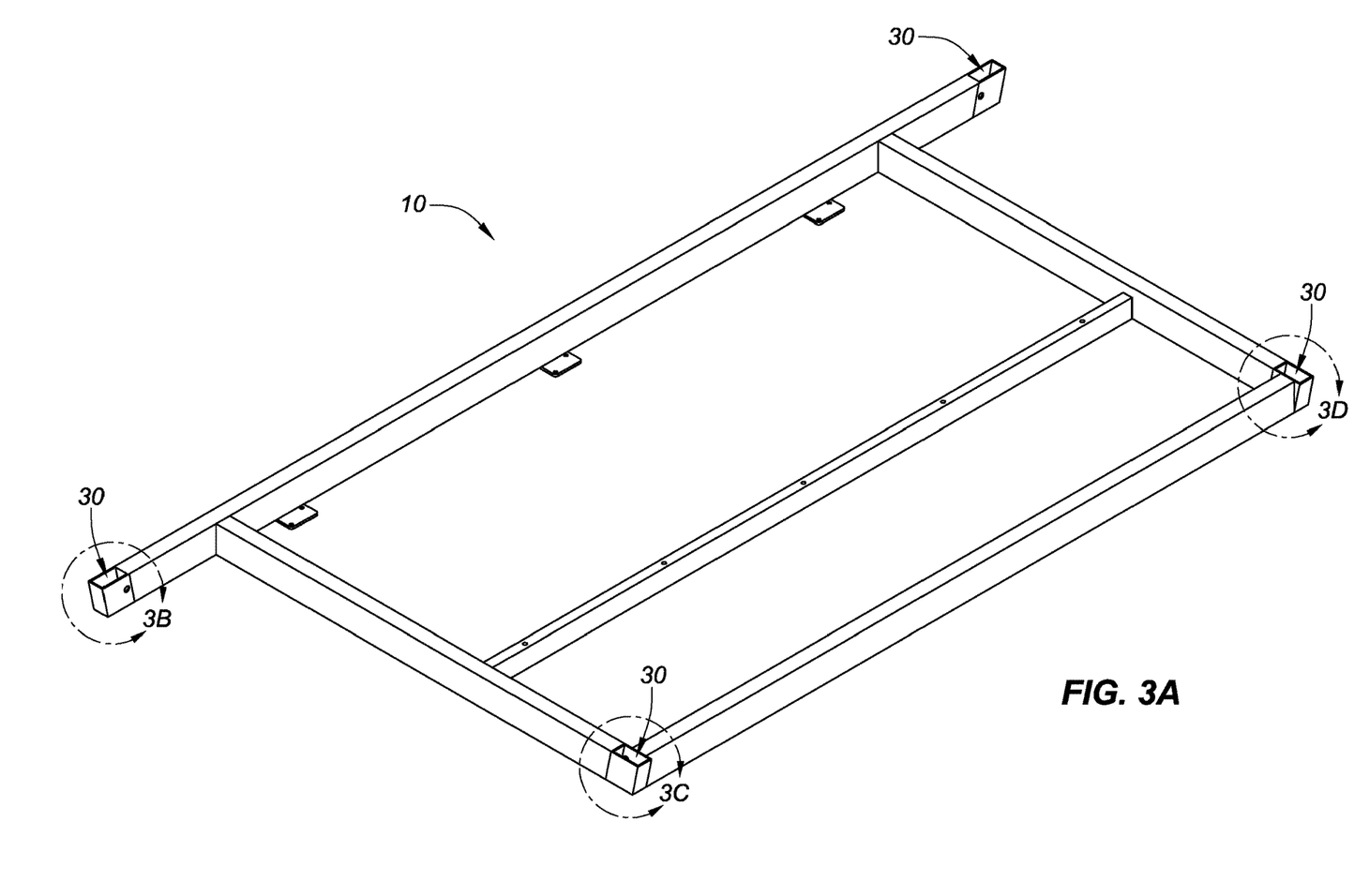
Figure 3B:
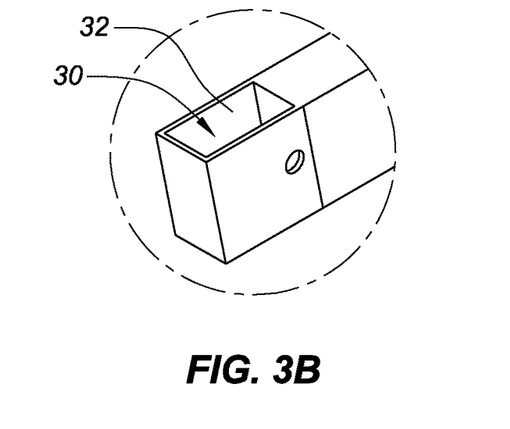
Figure 3C:
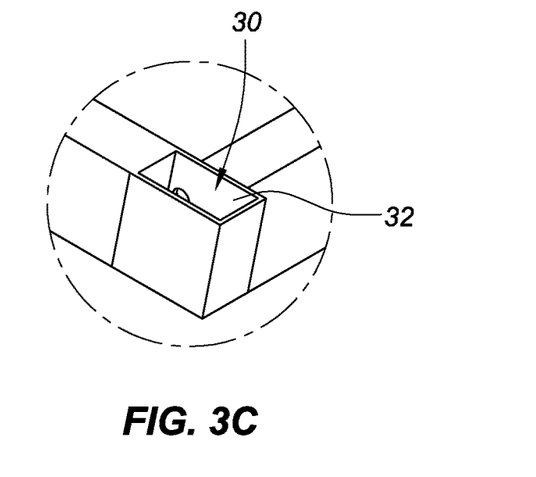
Figure 3D:
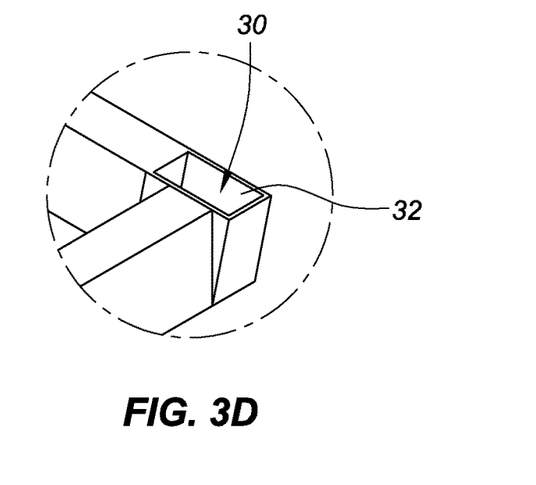
Figure 4A:
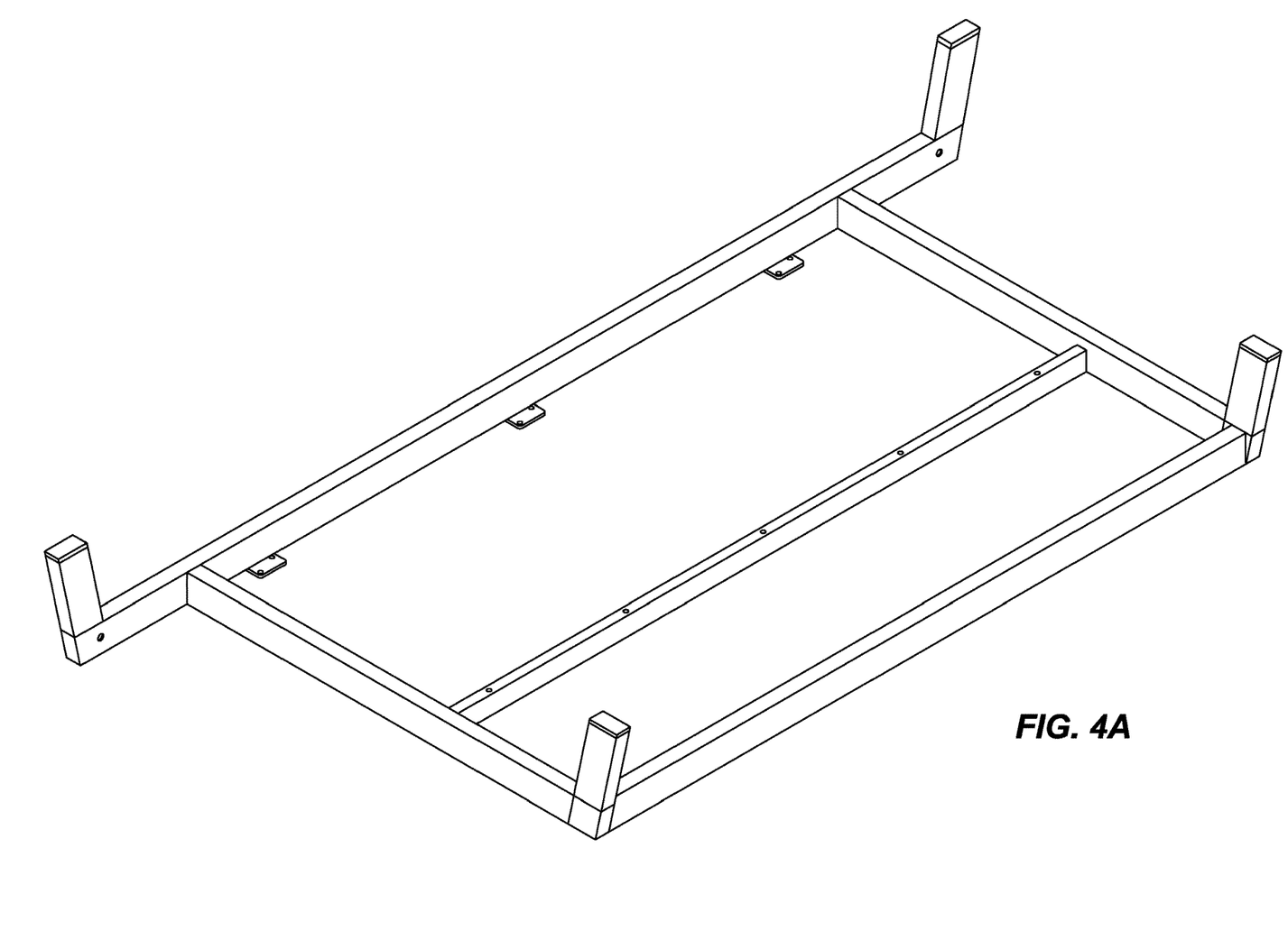
Figure 4B:
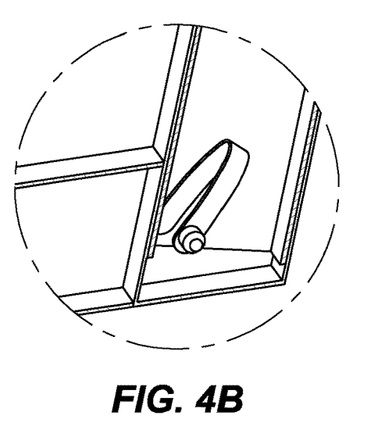
Figure 4C:
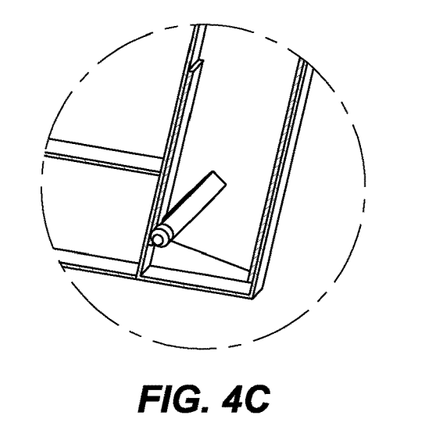
Figure 4D:
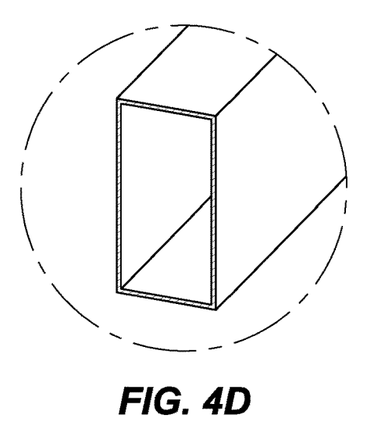
Figure 4E:
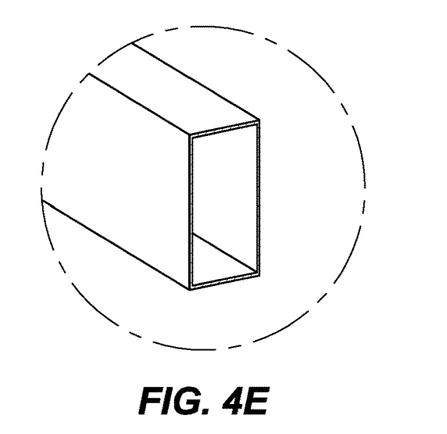
Figure 4F:
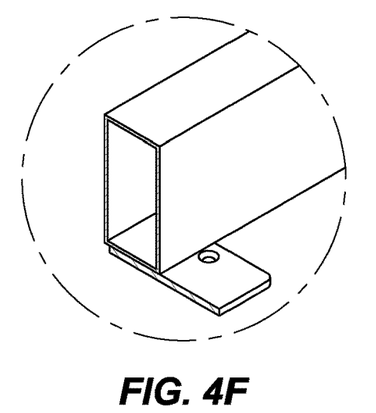
Figure 4G:
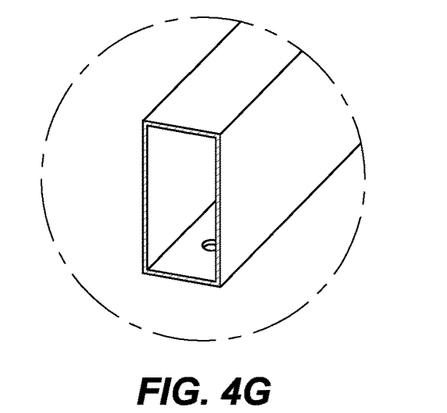

Turning now to FIG. 2, an alternate view of the embodiment of FIG. 1 is shown. As can be seen from this perspective, the legs may include a cap to prevent floor scratches (e.g., a nylon cap inserted into the bottom of the legs). Further, protective jackets may be included with the frame to prevent damage during shipping.

Turning now to FIG. 3, a variation of FIG. 2 is shown with the legs removed.

As may be seen in FIG. 3, each socket that is configured to receive a leg includes walls that enclose the central axis of the socket. That is, in this embodiment, each socket includes four walls, and they form a sleeve into which the leg is inserted. There is no side of the socket that remains open and unenclosed (e.g., open to the interior of a frame member). In this and other embodiments, the four walls of the socket form a rectangular prism into which the leg may be inserted. The thickness of the four walls in this embodiment may be 1.5 mm, and generally each wall has a greater thickness than other members of the frame. One of ordinary skill in the art with the benefit of this disclosure will readily understand that other designs could be used that might have different numbers of walls (e.g., a triangular prism, a hexagonal prism, a right circular cylinder, an angled elliptical cylinder, or any other type of generalized cylinder). The use of a fully enclosed socket may provide additional structural stability when the legs are inserted, especially if the legs fit tightly in the socket when inserted. FIG. 3 also illustrates that the frame is fully welded, provided yet more structural stability.

Turning now to FIG. 4, yet another view is shown. FIG. 4 illustrates various features and dimensions that may be present in some embodiments.

Figures 5A, 5B, 5C:
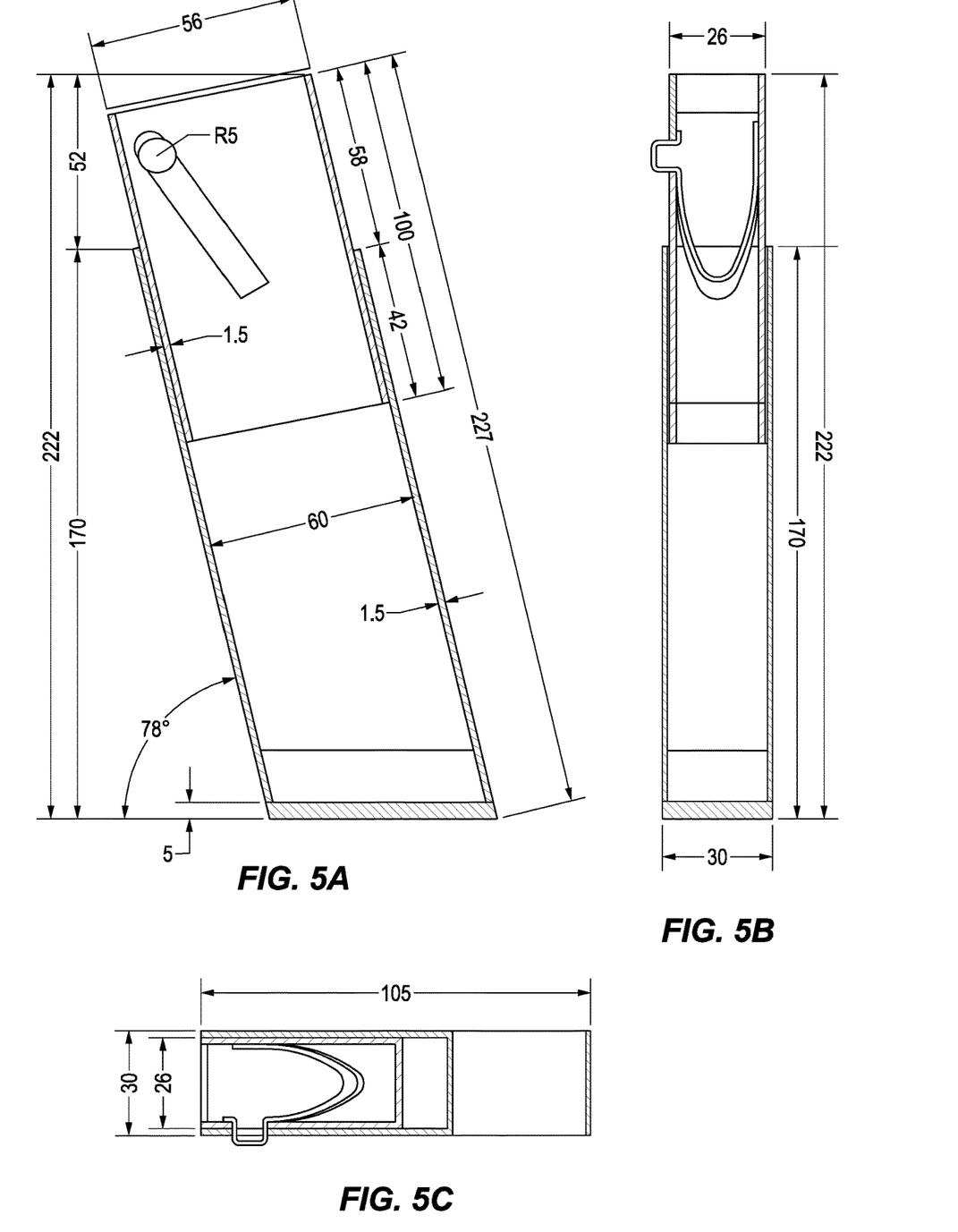
Figure 6A:
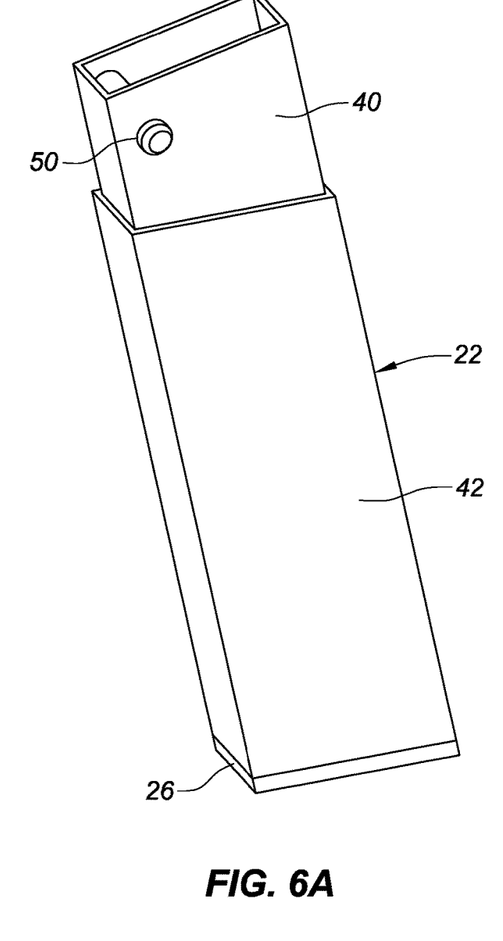
Figure 6B:
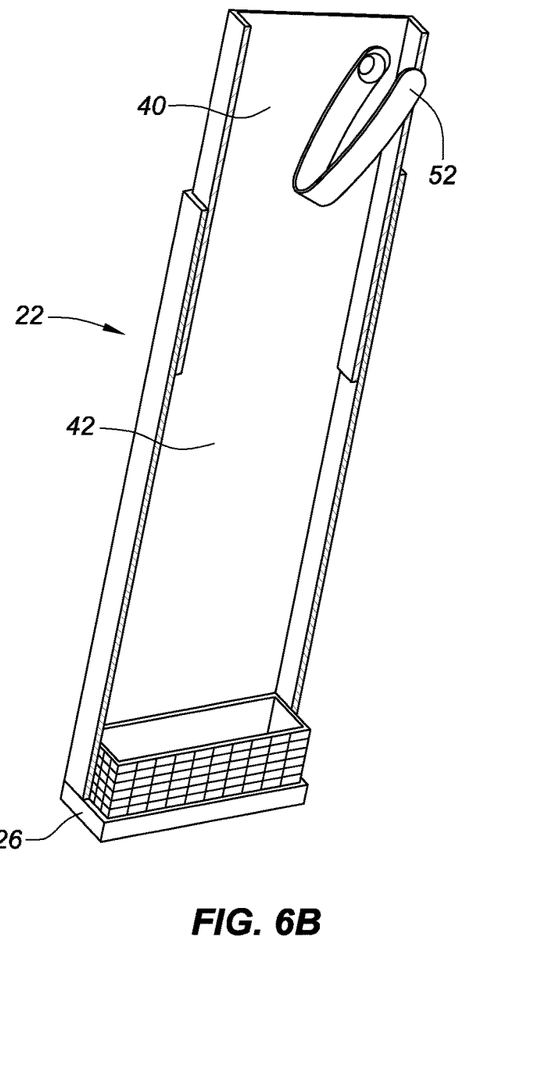
Figure 6C:
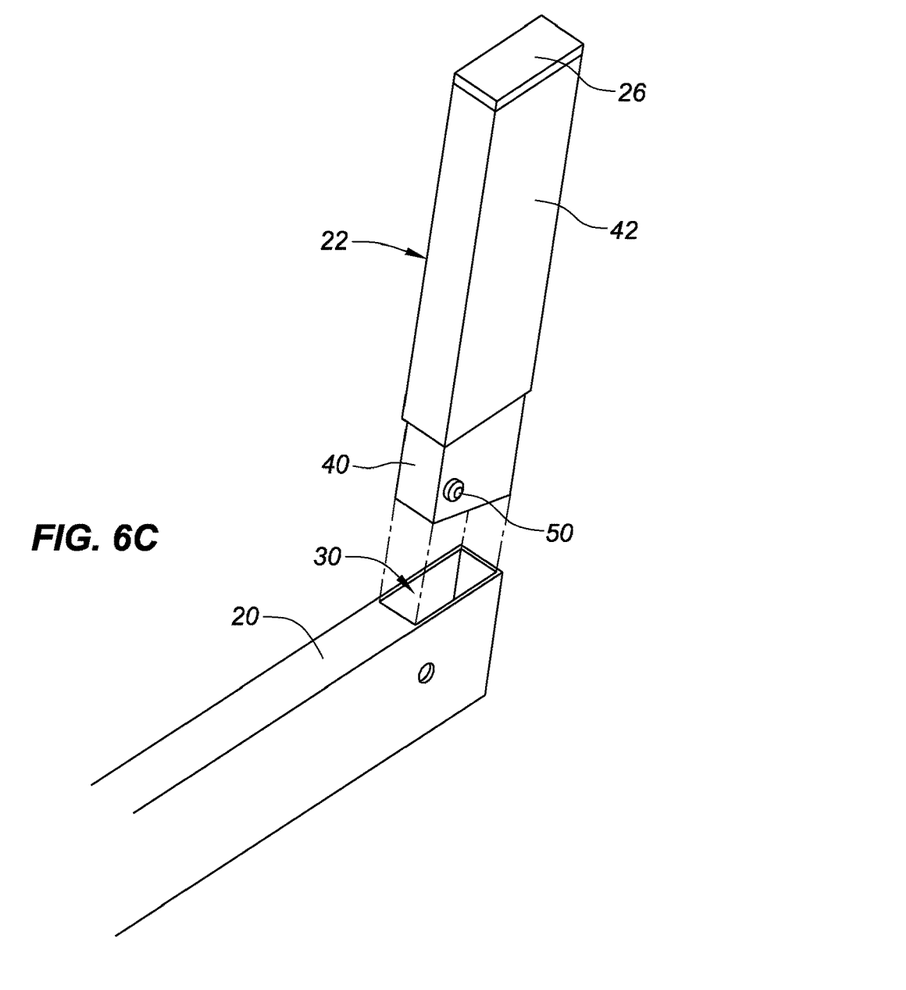
Figure 6D:
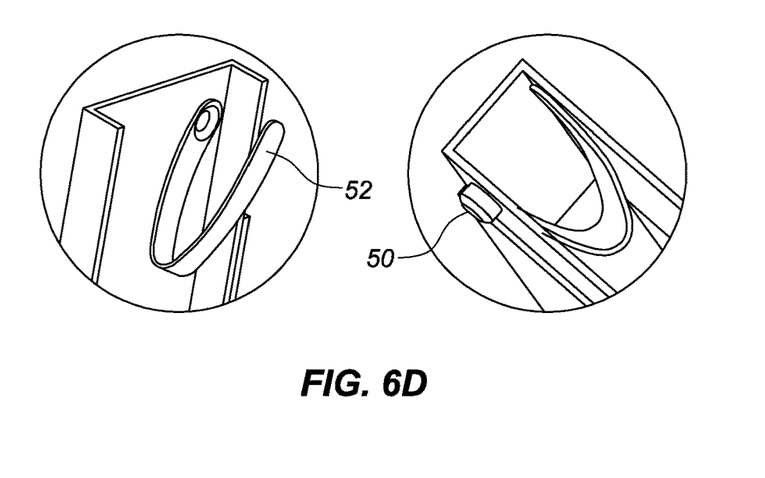
Figure 7A:
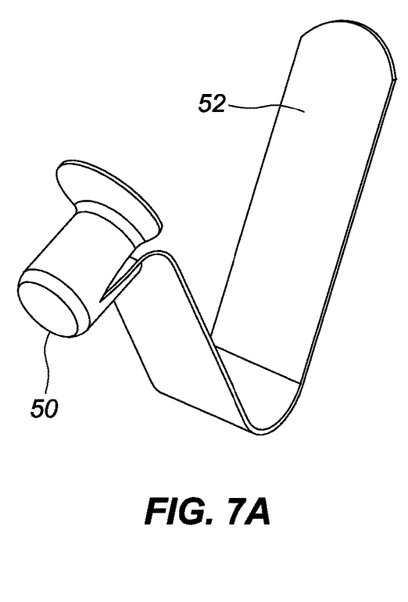
Figure 7B:
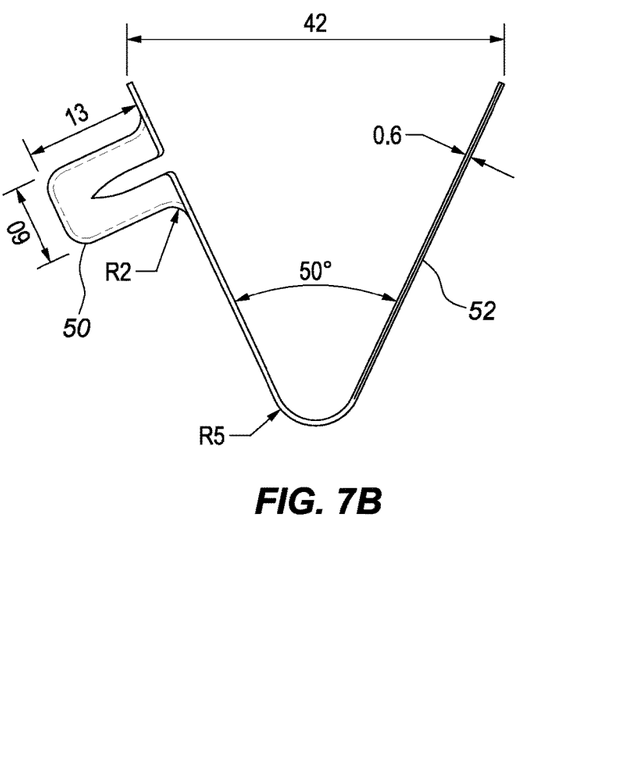
Figure 7C:
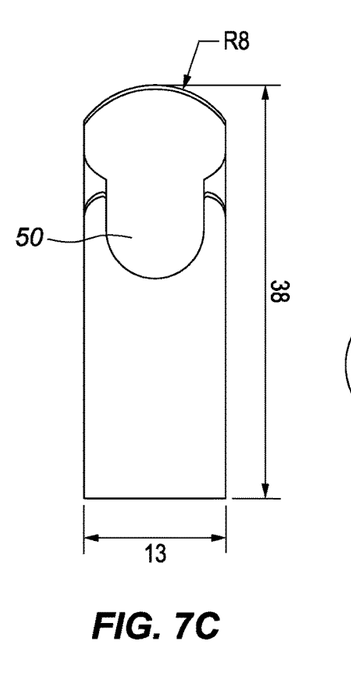
Figure 7D:
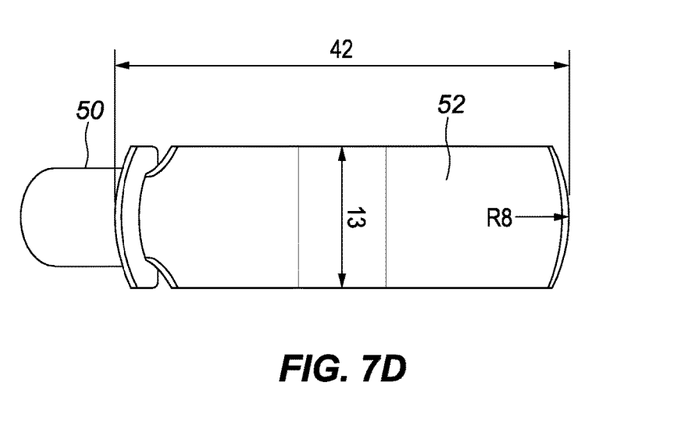

Turning now to FIG. 5, several detail views of a leg are shown. As can be seen, the leg may be constructed from two "layers" of steel welded together. This construction of a reinforced inner metal sleeve and outer metal sleeve may be designed and engineered to provide strength and durability to the leg (and overall frame). The interaction between the reinforced inner metal sleeve and the socket of the frame may make for a tighter and more secure leg attachment and reduce or eliminate shakiness in the assembled item. In particular, as shown in FIG. 5, the bottom portion of the leg may be made of one outer layer of 1.5 mm steel, and the top portion may include an inner layer also made of 1.5 mm steel. The portion of the inner layer that protrudes upward out of the outer layer may be inserted into the socket of the frame. When inserted into the socket, the combined thickness of a wall of the inner layer and a socket wall is about double the thickness, which may provide additional strength. The portion of the inner layer that overlaps and lies within the outer layer but does not protrude may also provide additional strength to the leg because this portion may have a wall with about double the thickness. This is also illustrated in inset B of FIG. 4, which shows a cutaway view of the two layers of a leg. An embodiment with this leg and frame design may have a weight capacity of about 750 pounds.

As further shown in FIG. 5, a push-lock button and spring may be included in the leg to retain it in position in the socket. A corresponding hole in the socket (not shown in FIG. 5) may receive the push-lock button. As further shown in FIG. 5, nylon caps may be inserted into the legs (e.g., to prevent floor scratching). These features are further illustrated in FIG. 6, which shows a leg being inserted into a socket.

FIG. 7 shows details of an example of a push-lock button and spring, which may be included in some embodiments.

Advantageously, the legs may be sized and shaped such that they are readily insertable into and/or removable from their locations within the frame without the need of tools, fasteners, or mounting features. For example, in some embodiments, the legs may be held in place by friction. In other embodiments, they may be held in place by push-lock buttons and springs as shown in FIG. 7.

As used herein, when two or more elements are referred to as "coupled" to one another, such term indicates that such two or more elements are in mechanical communication, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is currently being used for that particular function.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A furniture frame comprising:
    a plurality of frame members;
    a plurality of sockets each coupled to at least one of the plurality of frame members, the plurality of sockets each comprising a plurality of walls arranged about a central axis and enclosing the central axis; and
    a plurality of legs each configured to be removably inserted into one of the plurality of sockets;
    wherein a first portion of each of the plurality of legs that is configured to be inserted into the plurality of sockets includes a plurality of first walls having approximately a first thickness; and
    wherein a second portion of each of the plurality of legs that is not configured to be inserted into the plurality of sockets includes a portion of the plurality of first walls and a plurality of second walls disposed exterior to the plurality of first walls, wherein the plurality of first walls and the plurality of second walls are welded to each other, wherein the combined portion of the plurality of first walls and the plurality of second walls have approximately a second thickness that is twice as large as the first thickness, wherein each of the plurality of legs form an obtuse angle from a plane of the plurality of frame members, wherein one of the plurality of legs comprises a first leg forming a first obtuse angle in a first plane, and wherein another of the plurality of legs comprises a second leg forming a second obtuse angle in a second plane perpendicular to the first plane.

2. The furniture frame of claim 1, wherein at least one of the plurality of legs further comprises a push-lock button configured to interact with a corresponding hole of the furniture frame.

3. The furniture frame of claim 1, wherein the first thickness is 1.5 mm.

4. The furniture frame of claim 1, wherein the plurality of walls includes four walls.

5. The furniture frame of claim 4, wherein the four walls are arranged to form a rectangular prism.

6. The furniture frame of claim 1, wherein the plurality of frame members are disposed in a substantially planar arrangement.

7. The furniture frame of claim 1, wherein a thickness of the plurality of walls is approximately the first thickness.

8. The furniture frame of claim 1, wherein the each of the plurality of legs further comprises a cap disposed at an end opposite the socket.

9. The furniture frame of claim 1, wherein the plurality of frame members are metal and welded to one another.

10. The furniture frame of claim 1, wherein the each of the plurality of legs is constructed of a metal inner portion welded inside a metal outer portion.

11. A method for forming a furniture frame, the method comprising:
    forming a plurality of frame members from a frame material;
    forming a plurality of sockets each coupled to at least one of the plurality of frame members, the plurality of sockets each comprising a plurality of walls arranged about a central axis and enclosing the central axis;
    forming a plurality of legs each configured to be removably inserted into one of the plurality of sockets;
    shaping and sizing the leg such that a first portion of each of the plurality of legs that is configured to be inserted into one of the plurality of sockets, wherein the first portion comprises a plurality of first walls having approximately a first thickness, and a second portion of each of the plurality of legs that is not configured to be inserted into the socket includes a portion of the plurality of first walls and a plurality of second walls disposed exterior to the plurality of first walls, wherein the plurality of first walls and the plurality of second walls are welded to each other, wherein the combined portion of the plurality of first walls and the plurality of second walls have approximately a second thickness that is twice as large as the first thickness, wherein each of the plurality of legs form an obtuse angle from a plane of the plurality of frame members, wherein one of the plurality of legs comprises a first leg forming a first obtuse angle in a first plane, and wherein another of the plurality of legs comprises a second leg forming a second obtuse angle in a second plane perpendicular to the first plane.

12. The method of claim 11, wherein the frame material is metal.

13. The method of claim 11, wherein each of the plurality of legs is also formed from the frame material.

14. The method of claim 11, wherein forming the plurality of frame members includes welding the plurality of frame members.

15. The furniture frame of claim 1, wherein the plurality of legs further comprises a third leg, and a fourth leg, wherein a first obtuse angle formed from the first leg and a third obtuse angle formed by the third leg form the first plane, and wherein a fourth obtuse angle formed by the fourth leg forms a third plane perpendicular to the first plane.

16. The method of claim 11, wherein the plurality of legs further comprises a third leg, and a fourth leg, wherein a first obtuse angle formed from the first leg and a third obtuse angle formed by the third leg form the first plane, and wherein a fourth obtuse angle formed by the fourth leg forms a third plane perpendicular to the first plane.

* * * * *